United States Patent
Ide et al.

(10) Patent No.: US 10,459,653 B2
(45) Date of Patent: Oct. 29, 2019

(54) STORAGE SYSTEM, STORAGE DEVICE, AND STORAGE SYSTEM CONTROL METHOD FOR DUPLICATING DATA WITH COPY PAIR

(71) Applicant: HITACHI, LTD., Tokyo (JP)

(72) Inventors: Masahiro Ide, Tokyo (JP); Osamu Torigoe, Tokyo (JP); Shinichi Kasahara, Tokyo (JP)

(73) Assignee: HITACHI LTD., Tokyo (JP)

(*) Notice: Subject to any disclaimer, the term of this patent is extended or adjusted under 35 U.S.C. 154(b) by 0 days.

(21) Appl. No.: 15/761,672

(22) PCT Filed: Mar. 1, 2016

(86) PCT No.: PCT/JP2016/056301
§ 371 (c)(1),
(2) Date: Mar. 20, 2018

(87) PCT Pub. No.: WO2017/149674
PCT Pub. Date: Sep. 8, 2017

(65) Prior Publication Data
US 2018/0349031 A1    Dec. 6, 2018

(51) Int. Cl.
*G06F 3/06* (2006.01)
*G06F 11/16* (2006.01)

(52) U.S. Cl.
CPC ........... *G06F 3/065* (2013.01); *G06F 3/061* (2013.01); *G06F 3/067* (2013.01); *G06F 3/0619* (2013.01); *G06F 3/0683* (2013.01); *G06F 11/16* (2013.01)

(58) Field of Classification Search
CPC ........ G06F 3/061; G06F 3/065; G06F 3/0619; G06F 3/0683

USPC .................................................. 711/161, 162
See application file for complete search history.

(56) References Cited

U.S. PATENT DOCUMENTS

| 8,266,342 B1 | 9/2012 | Takada et al. |
| 2003/0163553 A1 | 8/2003 | Kitamura et al. |
| 2006/0048014 A1 | 3/2006 | Takahashi et al. |

(Continued)

FOREIGN PATENT DOCUMENTS

| JP | S59-195756 A | 11/1984 |
| JP | 2003-131917 A | 5/2003 |

(Continued)

OTHER PUBLICATIONS

International Search Report for WO 2017/149674 A1, dated Apr. 12, 2016.

*Primary Examiner* — Than Nguyen
(74) *Attorney, Agent, or Firm* — Volpe and Koenig, P.C.

(57) ABSTRACT

A storage system according to the present invention includes a first storage device configured to receive a command from a command issuing apparatus, a second storage device configured to manage target data of the command, and a third storage device configured to form a copy pair with the second storage device for the target data and store the target data. When the target data is forwarded from the first storage device to the third storage device through the second storage device and stored in the third storage device, the second storage device stores the target data therein so that the target data is redundantly stored in the second storage device and the third storage device.

17 Claims, 16 Drawing Sheets

(56) References Cited

U.S. PATENT DOCUMENTS

| | | | | |
|---|---|---|---|---|
| 2006/0112245 A1* | 5/2006 | Ikegaya | ................ | G06F 3/0622 |
| | | | | 711/163 |
| 2006/0287961 A1 | 12/2006 | Mori et al. | | |
| 2007/0055840 A1 | 3/2007 | Yamamoto et al. | | |
| 2010/0011179 A1* | 1/2010 | Sano | ................... | G06F 11/2069 |
| | | | | 711/162 |
| 2016/0132271 A1 | 5/2016 | Takada et al. | | |

FOREIGN PATENT DOCUMENTS

| | | |
|---|---|---|
| JP | 2003-248605 A | 9/2003 |
| JP | 2006-072635 A | 3/2006 |
| JP | 2006-146801 A | 6/2006 |
| JP | 2006-350824 A | 12/2006 |
| JP | 2007-004690 A | 1/2007 |
| JP | 2007-072538 A | 3/2007 |
| JP | 2010-020410 A | 1/2010 |
| JP | 2013-515978 A | 5/2013 |
| JP | 2014-504749 A | 2/2014 |
| WO | 2013/140459 A1 | 9/2013 |
| WO | 2015/011835 A1 | 1/2015 |

* cited by examiner

FIG.4

| LDEV-MP correspondence table | | T10 |
| --- | --- | --- |
| LDEV# | MP# | |
| LDEV A | MP#0 | |
| LDEV B | MP#4 | |
| LDEV C | Other storage | |
| ... | ... | |
| LDEV X | Other storage | |

T11

| LDEV-MP correspondence table | | |
| --- | --- | --- |
| LDEV# | Storage# | MP# |
| LDEV A | Storage 1 | MP#0 |
| LDEV B | Storage 1 | MP#4 |
| LDEV C | Storage 2 | MP#2A |
| ... | ... | ... |
| LDEV X | Storage 4 | MP#E4 |

STORAGE SYSTEM, STORAGE DEVICE, AND STORAGE SYSTEM CONTROL METHOD FOR DUPLICATING DATA WITH COPY PAIR

TECHNICAL FIELD

The present invention relates to a storage system, a storage device, and a storage system control method.

BACKGROUND ART

Some known storage systems (PTL 1 to 4) perform forwarding by using, for example, DMA (Direct Memory Access) between a plurality of devices. In known methods (PTL 2 and 4), data is doubly managed by writing the data to different devices.

CITATION LIST

Patent Literature

[PTL 1]
National Publication of International Patent Application No. 2013-515978
[PTL 2]
International Publication No. WO 2015/011835
[PTL 3]
National Publication of International Patent Application No. 2014-504749
[PTL 4]
International Publication No. WO 2013/140459

SUMMARY OF INVENTION

Technical Problem

In the conventional technology, the reliability of data storage can be increased by redundantly storing data in a plurality of different devices. However, the data is written to each of the plurality of different devices in the conventional technology, and thus it is difficult to improve response performance at data writing.

In addition, when it is checked whether data writing is normally ended in the conventional technology, the check needs to be performed on each device. In the conventional technology, since the writing check needs to be performed on each device, it is further difficult to improve the response performance.

In addition, in the conventional technology, data needs to be forwarded from a device having received the data to each of two devices for doubly storing the data. Accordingly, the data forwarding is activated twice, and thus it is difficult to improve the response performance at data writing.

The present invention is intended to solve the above-described problem and provide a storage system, a storage device, and a storage system control method that can achieve improvement of the reliability of data protection and the response performance at data writing. The present invention is also intended to provide a storage system, a storage device, and a storage system control method that forward data received by a first storage device to a third storage device through a second storage device while allowing the data to remain in the second storage device, thereby achieving swift redundant storage of the data in the second storage device and the third storage device.

Solution to Problem

To solve the above-described problem, a storage system according to the present invention is a storage system configured to process a command from a command issuing apparatus. The storage system includes: a plurality of storage devices coupled to the command issuing apparatus; a first storage device configured to receive a command from the command issuing apparatus and included in the plurality of storage devices; a second storage device configured to manage target data of the command and included in the plurality of storage devices; and a third storage device configured to form a copy pair with the second storage device for the target data and store the target data and included in the plurality of storage devices. When the target data is forwarded from the first storage device to the third storage device through the second storage device and stored in the third storage device, the second storage device stores the target data therein so that the target data is redundantly stored in the second storage device and the third storage device.

Advantageous Effects of Invention

According to the present invention, when the target data is forwarded from the first storage device having received the target data from the command issuing apparatus to the third storage device through the second storage device and stored in the third storage device, the second storage device stores the target data therein. Accordingly, the target data can be redundantly stored in the second storage device and the third storage device.

BRIEF DESCRIPTION OF DRAWINGS

FIG. 4 is an exemplary table listing the correspondence relation between a logical device (LDEV) and a micro processor (MP).

DESCRIPTION OF EMBODIMENTS

Embodiments of the present invention will be described below with reference to the accompanying drawings. As described below, in the present embodiment, when data is forwarded from a first storage device having received the data to a third storage device through a second storage device, the data remains in the second storage device. Accordingly, the data in the second storage device and the data in the third storage device form a copy pair and redundantly store the data. In addition, in the present embodiment, the data is examined at the third storage device, to which the data is forwarded, and as a result, when the third storage device determines that the data is normal, the data stored in the second storage device is handled as normal data in the second storage device.

Figure 1:
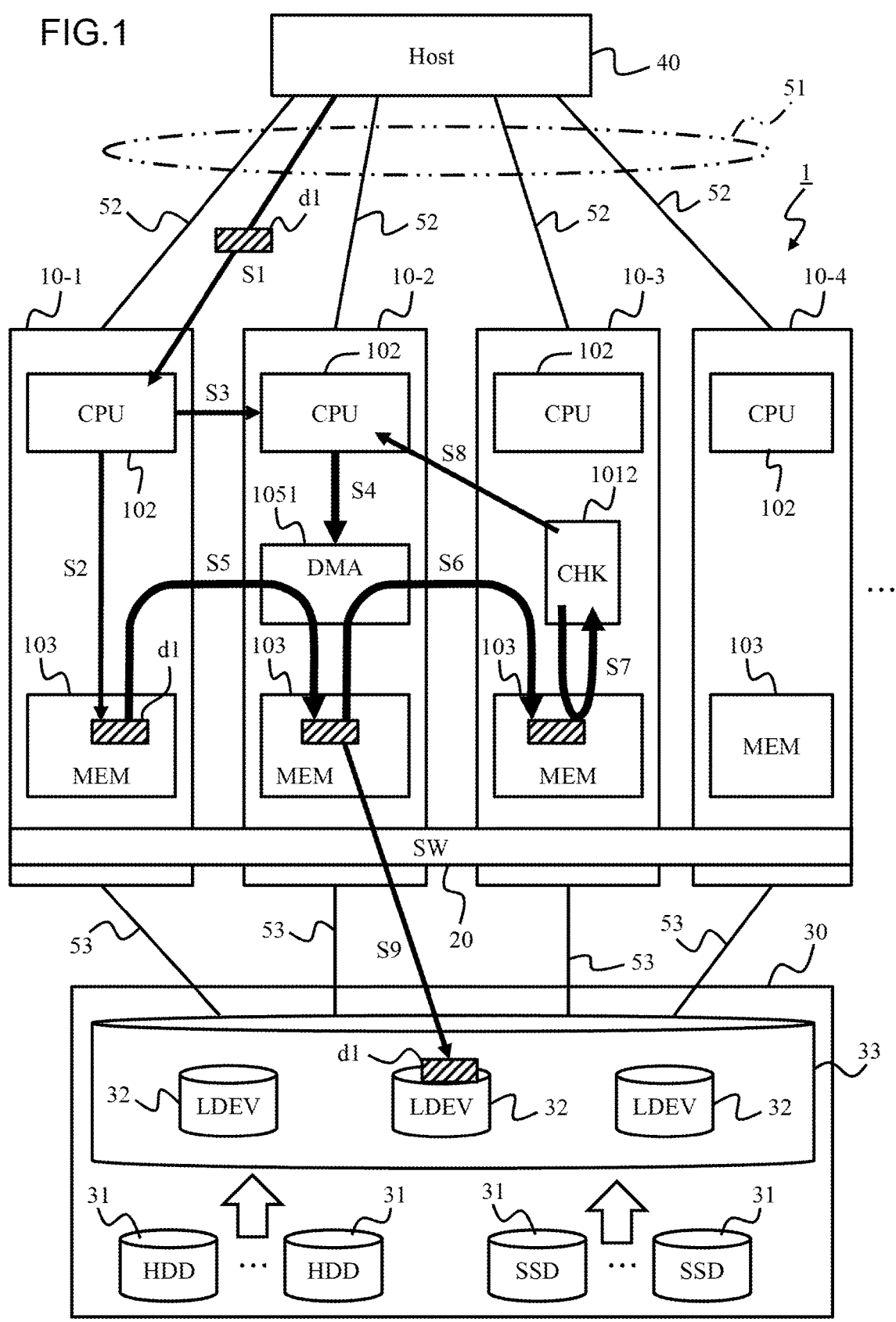
FIG. 1 is an explanatory diagram illustrating the entire outline of a storage system according to the present embodiment.

FIG. 1 illustrates the entire outline of a storage system according to the present embodiment. FIG. 1 illustrates the outline of the embodiment in detail enough to understand and perform the present invention, and the scope of the present invention is not limited to the configuration illustrated in FIG. 1.

This storage system 1 includes a plurality of storage devices 10-1, 10-2, 10-3, and 10-4. The storage devices 10-1 to 10-4 are coupled to each other to perform bidirectional communication therebetween through a switch 20 as an exemplary "common connection apparatus".

The storage devices 10-1 to 10-4 are each coupled to a host computer 40 through a physical path 52. Each physical path 52 belongs to an identical logical path 51. Thus, the host computer (hereinafter referred to as a host) 40 sees the storage devices 10-1 to 10-4 as one storage device. Hereinafter, the storage devices 10-1 to 10-4 are referred to as storage devices 10 when not distinguished from each other.

The host 40 is an exemplary "command issuing apparatus". The host 40 may be a main frame or what is called an open server. When the host is a main frame, communication protocols such as Fibre Connection (FICON (registered trademark)), Enterprise System Connection (ESCON (registered trademark)), Advanced Connection Architecture (ACONARC (registered trademark), and Fibre Connection Architecture (FIBARC (registered trademark)) are used between the host 40 and each storage device 10. When the host 40 is an open server, communication protocols such as Transmission Control Protocol/Internet Protocol (TCP/IP) and Internet Small Computer System Interface (iSCSI) are used between the host 40 and each storage device 10.

A storage unit 30 is separately provided from each storage device 10 and includes a plurality of storages 31 in an enclosure. The storage unit 30 is coupled to each storage device 10 through a physical path 53.

The storages 31 may be various kinds of data readable and writable drives such as hard disk devices, semiconductor memory devices, optical disk devices, and magneto optical disc devices. When hard disk devices are used, for example, a Fibre Channel (FC) disk, Small Computer System Interface (SCSI) disk, an SATA disk, an AT Attachment (ATA) disk, and a Serial Attached SCSI (SAS) disk can be used. In addition, various kinds of storages such as a flash memory (SSD), a magnetoresistive random access memory (MRAM), a phase-change memory, a resistive random-access memory (ReRAM), and a ferroelectric random access memory (FeRAM) may be used. For example, different kinds of storages may be used in mixture. FIG. 1 illustrates an example with hard disks and flash memories.

At least one logical volume 32 as a logical device is generated from a physical storage area included in at least one (typically, a plurality) of the storages 31. Each logical volume 32 is denoted as LDEV (Logical DEVice) in FIG. 1.

The logical volume 32 is managed in a pool 33. A virtual logical volume may be generated by using a plurality of the logical volumes 32 in the pool 33. The storage area of the logical volume 32 is allocated to the virtual logical volume each time data is newly written from the host 40. The virtual logical volume only uses a necessary amount of the storage area of the logical volume 32 so that storage resources in the pool 33 can be used without loss. The logical volume 32 is exemplarily described below as a storage to and from which data is input and output.

The following describes a schematic configuration of each storage device 10. The storage device 10 includes, for example, a central processing unit (CPU) 102, a memory 103, a check unit 1012, and a DMA forwarding circuit (hereinafter referred to as a DMA) 1051.

The CPU 102 as a "control unit" includes a plurality of micro processors 1021 (refer to MPs 1021 in FIG. 3) and controls operation of the storage device 10. The memory 103 is, for example, a volatile memory, a non-volatile memory or a combination of a volatile memory and a non-volatile memory. The memory 103 stores data received from the host 40 or another storage device 10 or data read from the logical volume 32.

The check unit 1012 may be, for example, configured as a hardware circuit or generated as software. FIG. 1 illustrates an example in which the check unit 1012 is configured as a hardware circuit. The check unit 1012 examines whether data is correct data based on a guarantee code added to the data. In the storage system, data is divided and managed in logical blocks. The guarantee code is added to each logical block. The guarantee code may include, for example, information (longitudinal redundancy check (LRC)) for detecting error in the content of the logical block and information (LA) for detecting error in a write destination source of the logical block.

The DMA 1051 is a circuit for DMA forwarding of data between the storage devices 10. The DMA 1051 is activated in response to an instruction from the CPU 102 and forwards data from the memory 103 as a forward source to the memory 103 as a forward destination source.

The following describes a schematic operation of the storage system 1. The host 40 issues a write command to the storage device 10 and requests writing of data d1 (S1). The write command and the data d1 are received by any of the storage devices 10. In this example, the write command and the data d1 are received by the first storage device 10-1 among the storage devices 10.

The first storage device 10-1 stores the write command and the data d1 in the memory 103 in the first storage device 10-1 (S2). The storage device 10-1 having received the write command and the data d1 is also referred to as a reception storage device.

The write command specifies a write destination source address (logical block address (LEA)) of the data d1. The logical volume 32 to which the data d1 is to be written can be specified from the write destination source address. Each logical volume 32 stored in the storage unit 30 is set to the storage device 10 having management authority thereof. In this example, the second storage device 10-2 among the storage devices 10 has management authority of the logical volume 32 as the write destination source of the data d1. The storage device 10-2 managing the write destination source volume 32 of the data d1 is also referred to as an owner storage device.

The storage system 1 according to the present embodiment achieves increased reliability of data storage by storing the data d1 written by the host 40 in the different storage devices 10. Specifically, the data d1 is stored in both of the memory 103 of the second storage device 10-2 having management authority for the write destination source volume 32 of the data d1 and the memory 103 of the third storage device 10-3 forming a copy pair with the second storage device 10-2. The third storage device 10-3 is also referred to as a pair storage device.

Having received the write command and the data d1, the first storage device 10-1 notifies the second storage device 10-2 as the owner storage device of the data d1 of the reception of the write command (S3).

When, upon the notification from the first storage device 10-1 (S3), the second storage device 10-2 senses writing of the data d1 having a write destination source at the logical volume 32 under management of the second storage device 10-2, the second storage device 10-2 provides a forward instruction to the DMA 1051 of the second storage device 10-2 (S4).

The DMA 1051 of the second storage device 10-2 reads the data d1 from the memory 103 of the first storage device 10-1 (S5), and forwards the read data d1 to the memory 103 of the third storage device 10-3 through the memory 103 of the second storage device 10-2 (S6). In this case, the data d1 is also stored in the memory 103 of the second storage device 10-2, but the second storage device 10-2 does not delete the data d1, allowing the data d1 to remain in the memory 103.

The third storage device 10-3 as a final forward destination source of the data d1 examines whether the data d1 is normal by using the check unit 1012 (S7). Specifically, the check unit 1012 checks whether, for example, bit error occurs in the data d1 based on the guarantee code added to the data d1. The check unit 1012 notifies the second storage device 10-2 of a result of the examination (S8).

Based on the result (normal) of the examination at the third storage device 10-3, the second storage device 10-2 handles, as normal data, the data d1 stored in the memory 103 in the second storage device 10-2. The second storage device 10-2 does not check the data d1 based on the guarantee code of the data d1. Only the third storage device 10-3 as a final forward destination source checks whether the data d1 is normal.

In this manner, the data d1 stored in the memory 103 of the first storage device 10-1 is stored in the memory 103 of the third storage device 10-3 through the memory 103 of the second storage device 10-2. The data d1 is redundantly stored in the third storage device 10-3 and the second storage device 10-2.

Thereafter, destage processing is activated at a predetermined timing, and the data stored in the memory 103 of the second storage device 10-2 is written to the logical volume 32 having the address specified in the write command (S9).

For understanding of the invention, the present embodiment describes the example in which the storage device 10-1 that receives the write command and the data d1, the storage device 10-2 that manages the logical volume 32 as a storage destination source of the data d1, and the storage device 10-3 that stores the data d1 separately from the storage device 10-2 having management authority are different from each other. However, the present invention is not limited thereto, and, for example, the reception storage device and the owner storage device may be identical, or the reception storage device and the pair storage device may be identical. The storage system according to the Present embodiment achieves increased reliability of storage by doubly storing data, and thus the owner storage device and the pair storage device are not identical.

According to the present embodiment thus configured, the data d1 only needs to be examined once, which leads to improvement of response performance when the host 40 writes the data d1. Although the data d1 is examined each time the data d1 is forwarded in the conventional technology, the data d1 is examined only by the third storage device 10-3 as a final forward destination source in the present embodiment, which leads to reduction of a time taken for examination. Since the memory 103 of the second storage device 10-2 is merely a relay place used to forward the data d1 to the memory 103 of the third storage device 10-3, the data d1 left in the memory 103 of the second storage device 10-2 can be regarded to be normal when the data d1 is determined to be normal by the third storage device 10-3.

According to the present embodiment, the second storage device 10-2 can perform DMA forwarding of the data d1 received by the first storage device 10-1 to the third storage device 10-3 through the second storage device 10-2 by providing a forward instruction to the DMA 1051 once. In the present embodiment, activation of DMA forwarding only needs to be instructed once, which leads to, together with the above-described reduction by half of the number of times that the data d1 is checked, further improvement of the response performance at write processing.

[Embodiment 1]

Figure 2:
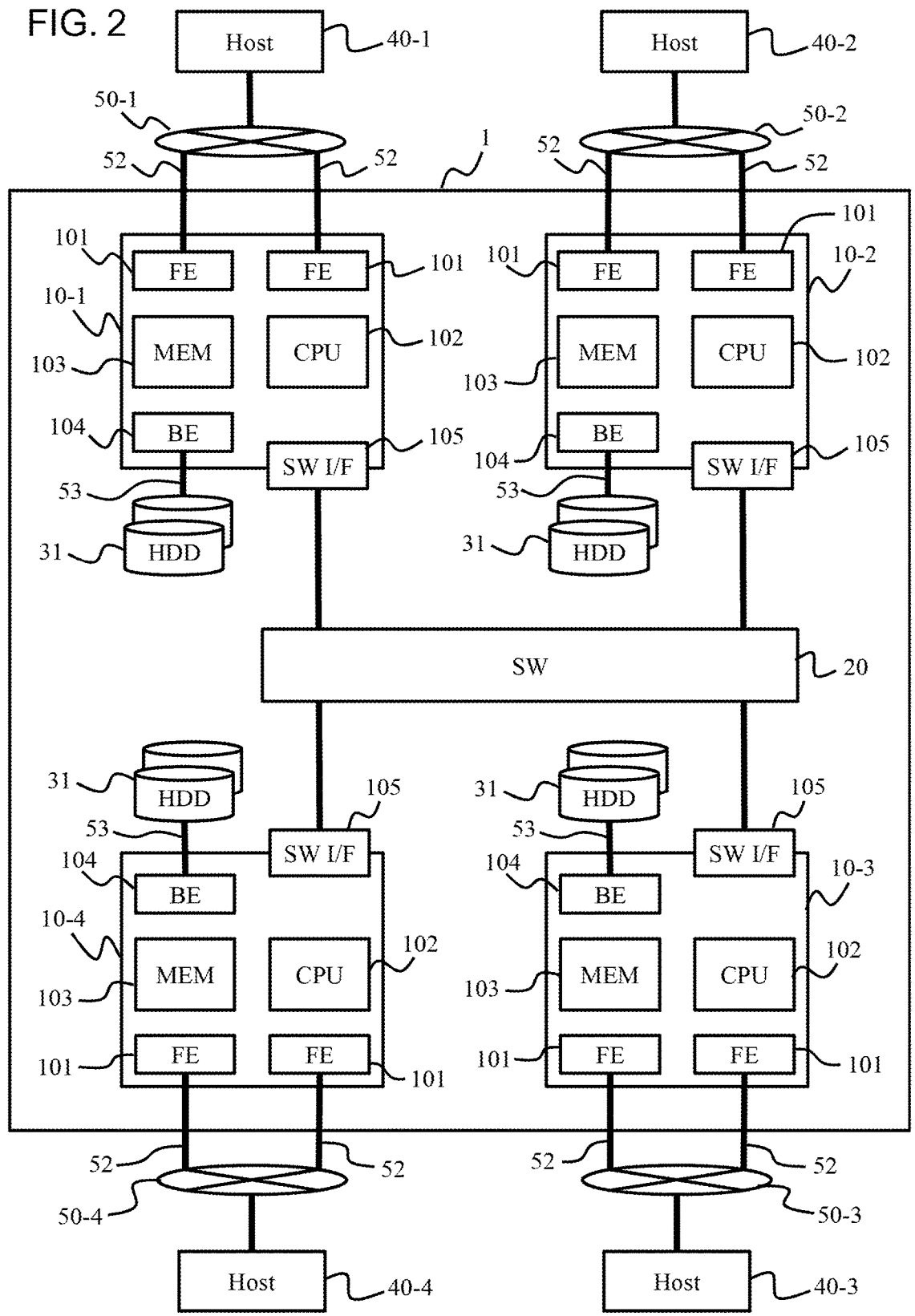
FIG. 2 is a hardware configuration diagram of the storage system.

FIG. 2 is a hardware configuration diagram of the storage system 1. As described with reference to FIG. 1, the storage system 1 includes the plurality of storage devices 10-1 to 10-4, and the storage devices 10-1 to 10-4 form a cluster. In the present embodiment, the four storage devices 10-1 to 10-4 are provided, but the number of storage devices included in the storage system 1 is not limited to four. Hereinafter, the storage devices 10-1 to 10-4 are referred to as the storage device 10 when not distinguished from each other.

The storage devices 10 are coupled to hosts 40-1 to 40-4 through communication networks 50-1 to 50-4 to perform bidirectional communication therebetween. At least part of the communication networks 50-1 to 50-4 may be common to each other, and all communication networks 50-1 to 50-4 may be an identical communication network. Similarly, at least part of the hosts 40-1 to 40-4 may be common to each other, and all hosts 40-1 to 40-4 may be an identical host. When not distinguished from each other, the hosts 40-1 to 40-4 are referred to as a host 40, and the communication networks 50-1 to 50-4 are referred to as a communication network 50.

Each storage device 10 includes, for example, a front end interface 101, the CPU 102, the memory 103, a back end interface 104, and a switch interface 105. The switch interface 105 includes the DMA 1051 as described with reference to FIG. 3. The storage devices 10 are coupled to each other through the switch 20 capable of DMA forwarding to perform bidirectional communication therebetween.

The front end interface 101 is an apparatus for bidirectional communication with the host 40 through the communication network 50. Hereinafter, the front end interface 101 is abbreviated as the FE 101 in some cases. The FE 101 receives a command and data from the host 40 and transmits data and notification to the host 40.

The back end interface 104 is an apparatus for inputting and outputting data from and to the storage 31. As described above, the logical volume 32 as a logical device can be generated by virtualizing the storage area of the physical storage 31. The CPU 102 reads and writes data from and to the logical volume 32 through the back end interface 104. FIG. 2 omits illustration of the storage unit 30.

The switch interface 105 is an apparatus for bidirectional communication with another storage device 10 through the switch 20.

Figure 3:
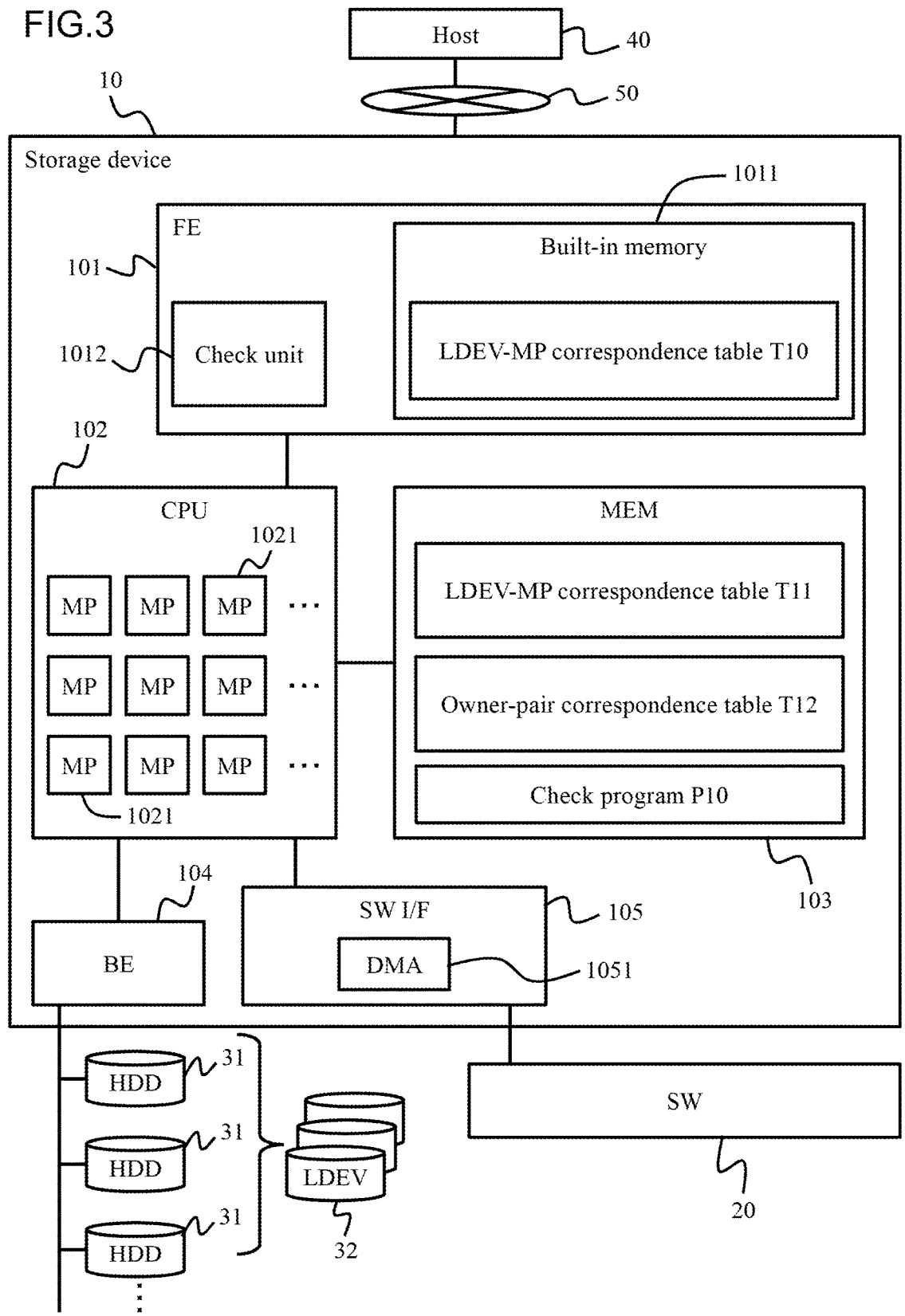
FIG. 3 is a configuration diagram of a storage device.

The configuration of the storage device 10 will be described in detail with reference to FIG. 3. The CPU 102 includes the plurality of micro processors 1021. Hereinafter, the micro processors 1021 are abbreviated as the MPs 1021 in some cases. The CPU 102 allocates, for example, command processing to any of the built-in MPs 1021. The CPU 102 is capable of processing a plurality of commands in parallel. Processing of which the CPU 102 is in charge is executed by any of the MPs 1021 in reality, and thus there is no need to precisely distinguish the CPU 102 and the MP 1021.

The front end interface 101 includes, for example, a built-in memory 1011 and the check unit 1012 in addition to a function (not illustrated) in charge of communication control. The built-in memory 1011 stores a LDEV-MP correspondence table T10 indicating the correspondence relation between the logical volumes 32 and the MPs 1021. The table T10 is part of a table T11 in the memory 103. Data in the range of pieces of data stored in the table T11 to be described later, which is necessary for processing at the front end interface 101 is copied to the table T10.

The check unit 1012 adds a guarantee code to each logical block of data received from the host 40 and examines whether data of a logical block is normal based on the guarantee code added to the logical block. The check unit 1012 may be configured as a hardware circuit or may be achieved as software. The check function may be provided to the CPU 102 instead of the front end interface 101. The CPU 102 can check whether data is normal by executing a check program P10.

The memory 103 includes, for example, a work area provided for the CPU 102, a cache area in which data received from the host 40 or another storage device 10 is stored, a management information area in which a table used by the CPU 102 is stored, and a program area in which a computer program executed by the CPU 102 is stored. A memory may be prepared for each area.

The program area can store, for example, the check program P10 in addition to an operating system and driver software (all not illustrated). The management information area can store, for example, the LDEV-MP correspondence table T11 and an owner-pair correspondence table T12. The tables T10, T11, and T12 will be described later in detail.

The switch interface 105 is coupled to the switch interface 105 in any other storage device 10 through the switch 20. The switch interface 105 includes the DMA 1051. The switch interfaces 105 can perform data DMA forwarding between the memories 103 through the switch 20.

FIG. 4 is an explanatory diagram illustrating the configuration of the LDEV-MP correspondence table T10 in the front end interface 101 and the configuration of the LDEV-MP correspondence table T11 in the memory 103 in comparison.

The configuration of the LDEV-MP correspondence table T11 in the memory 103 will be described first. The table T11 manages, for example, a volume number (LDEV #), a storage number, and an MP number in association.

The volume number is information for identifying each logical volume 32 in the storage system 1. The storage number is information for identifying each storage device 10 in the storage system 1. The MP number is information for identifying each MP 1021 of the CPU 102. In other words, the table T11 indicates by which MP 1021 of which storage device 10 each logical volume 32 in the storage system 1 is managed.

The following describes the table T10 in the front end interface 101. The table T10 manages a volume number and an MP number in association. The table T10 only stores the correspondence relation between each MP 1021 and the logical volume 32 related to the storage device 10 provided to the front end interface 101, and thus includes no storage number. The logical volume 32 under management of any other storage device is not managed by the table T10. The table T10 sets the value of "other storage" to the MP number corresponding to the logical volume 32 not managed by the table T10 so that it can be recognized that the logical volume 32 is under management of any other storage device 10.

When the front end interface 101 has received a command to the logical volume 32 not managed by the table T10, the CPU 102 notifies the storage device 10 managing the logical volume 32 of the command.

Figure 5:
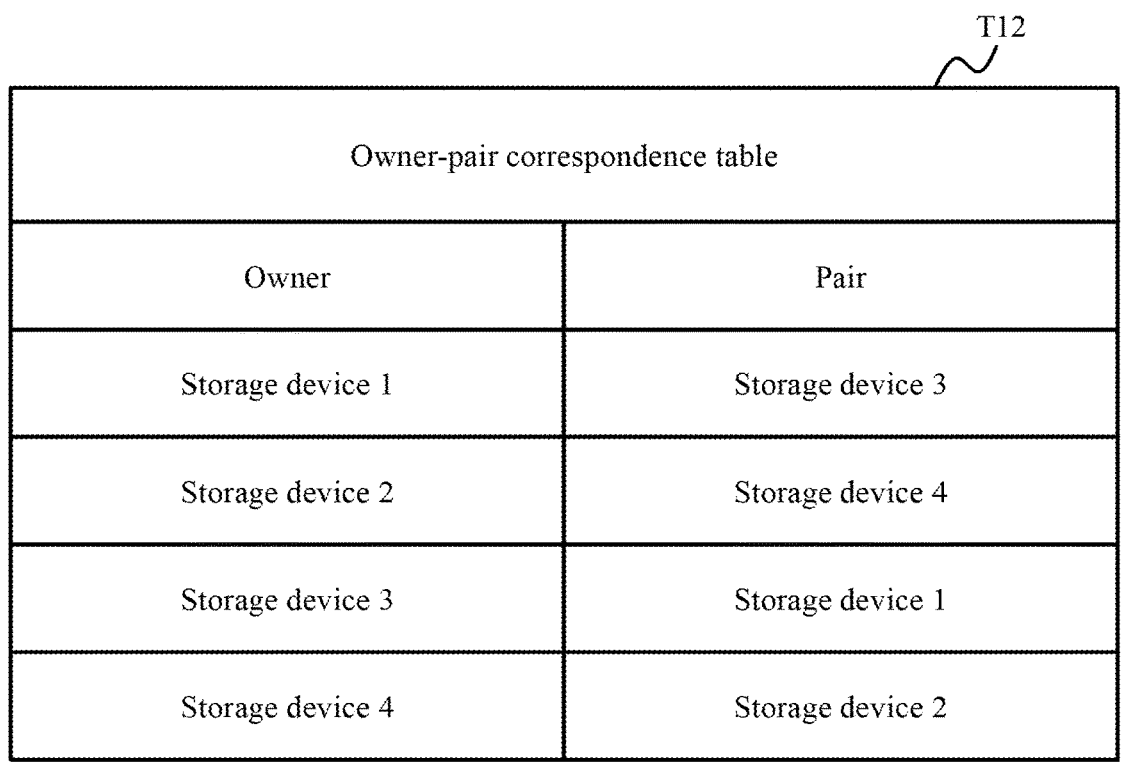
FIG. 5 is an exemplary table listing the correspondence relation between an owner device and a pair device.

FIG. 5 illustrates a table T12 managing the correspondence relation between an owner and a pair. The owner is a storage device managing the logical volume 32 as a processing target of a command. In other words, the owner is a storage device managing data as a processing target of a command. The pair is a storage device forming a copy pair with the storage device as the owner for data as a processing target of a command. A storage device as the owner is referred to as an owner device or an owner side storage device, a storage device forming a pair with the owner device is referred to as a pair device or a pair side storage device, and a storage device having received a command is referred to as a reception device or a reception storage device in some cases. In the example illustrated in FIG. 5, the storage device 10-1 and the storage device 10-3 form one pair, and the storage device 10-2 and the storage device 10-4 form the other pair. However, the combinations illustrated in FIG. 5 are not fixed but dynamically changeable in accordance with the situation of the storage system 1.

The following describes the entire operation of the storage system 1 with reference to FIGS. 6 to 9. The front end interface 101 of any of the storage devices 10 receives a write command and write data issued from the host 40 (S11).

The front end interface 101 of the reception device specifies the logical volume 32 storing target data of the write command. The front end interface 101 specifies, by using the table T10, the logical volume 32 storing the target data of the write command and determines whether the MP 1021 corresponding to the logical volume 32 exists in the device (the reception device) (S12).

Having determined that the MP 1021 corresponding to the target data does not exist in the reception device (NO at S13), the front end interface 101 stores the write command and the write data in the memory 103 of the reception device and notifies the MP 1021 in the reception device (S14).

Having received the notification, the MP 1021 specifies the owner device by referring to the table T11 in the memory 103 (S15) and notifies the MP 1021 in the owner device of the issuing of the write command (S16). Specifically, the MP 1021 in the reception device performs DMA forwarding of the write command stored in the memory 103 of the reception device to the memory 103 of the owner device by using the DMA 1051 of the reception device. In this example, only the write command is forwarded, but the write data is not forwarded. The DMA forwarding of the write data is led by the owner device. The MP 1021 in charge of processing the target data of the write command in the owner device is referred to as an owner MP. The MP 1021 in charge of redundant storage of the target data (write data) in the pair device is referred to as a pair MP.

When the MP 1021 corresponding to the target data of the write command exists in the reception device (YES at S13), the reception device and the owner device are identical. The front end interface 101 of the reception device stores the write command and the write data in the memory 103 of the reception device and notifies the MP 1021 by which the write command is to be processed (S17).

The MP 1021 in the owner device in charge of management of the write data prepares, in the memory 103 in the owner device, a storage area for storing the write data (S18). The MP 1021 in the owner device checks the state of the pair device in charge of data doubling by referring to the table T11 in the memory 103 of the owner device (S19).

Subsequently, the MP 1021 in the owner device determines whether the state of the pair device is normal (S20). When having determined that the state of the pair device is normal (YES at S20), the MP 1021 in the owner device transitions to step S22 in FIG. 7 through Connector 1. When having determined that the state of the pair device is not normal (NO at S20), the MP 1021 in the owner device selects a new pair device from among the other storage devices 10 in the storage system 1 and updates the owner-pair correspondence table T12 (S21). When the table T12 is updated at step S21, the update is notified to each storage device 10 and reflected onto the table T12 held by the storage device.

Exemplary cases in which the state of the pair device is not normal include a case in which no free space equal to or larger than a predetermined value is available in the memory 103 of the pair device, a case in which a processing load on the CPU 102 of the pair device is equal to or larger than a predetermined value, a case in which data forwarding to the pair device has problem, and a case in which the pair device is failed and stopped. In any case other than these cases, it can be determined that the state of the pair device is normal.

Figure 7:
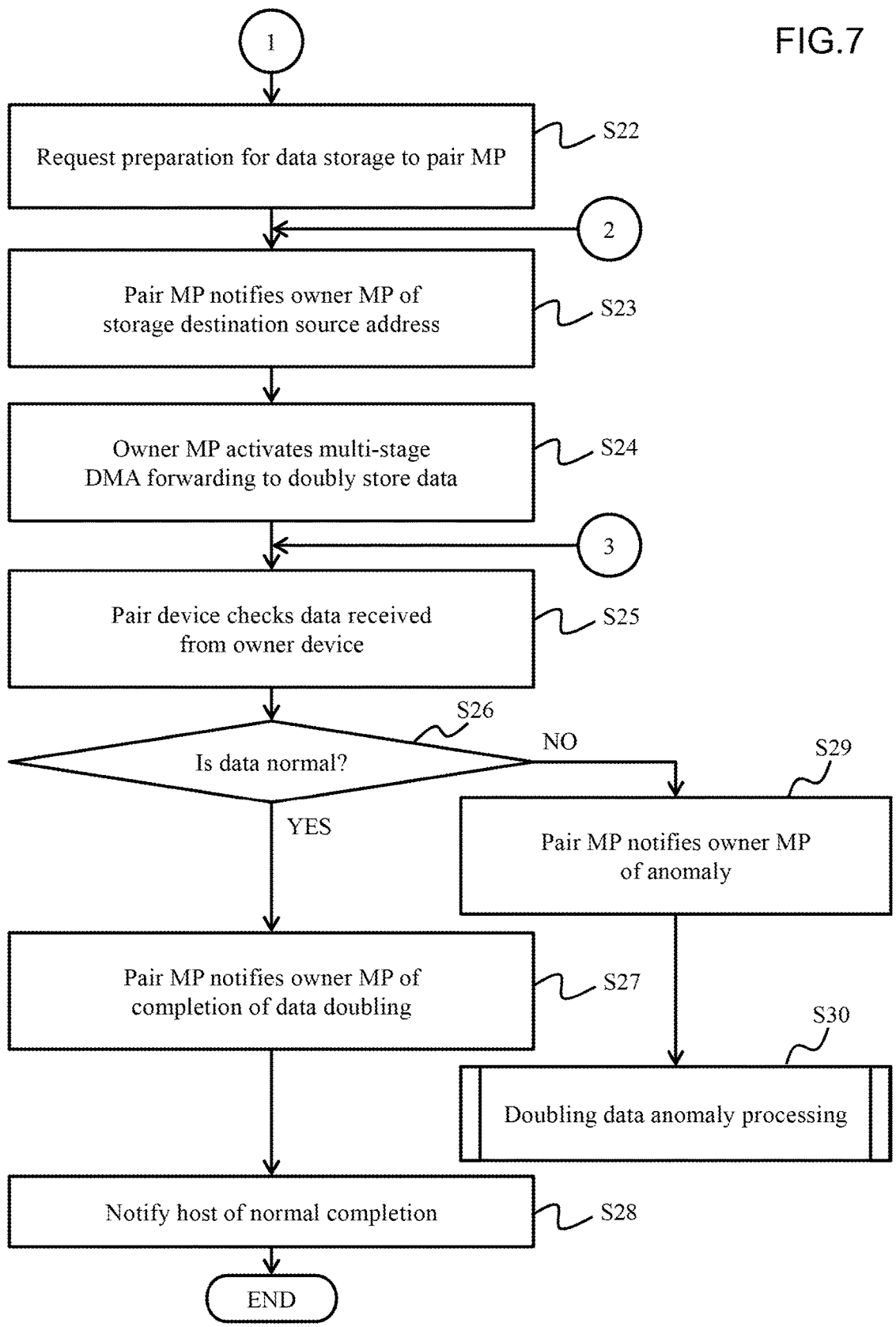
FIG. 7 is a flowchart following FIG. 6.

The description continues with reference to FIG. 7. When having determined that the state of the pair device is normal (YES at S20), the MP 1021 in the owner device requests storage preparation for the write data to the MP 1021 in the pair device (S22).

Having received the request, the MP 1021 secures a storage area for storing the write data in the memory 103 of the pair device and notifies the MP 1021 in the owner device of the storage destination source address of the write data (S23).

Having received the notification from the MP 1021 in the pair device, the MP 1021 in the owner device activates multi-stage DMA forwarding for doubly storing data by providing a forward instruction to the DMA 1051 of the owner device (S24). The content of the forward instruction will be described later with reference to FIG. 8. A method of the multi-stage DMA forwarding will be described later with reference to FIG. 10.

Figure 11:
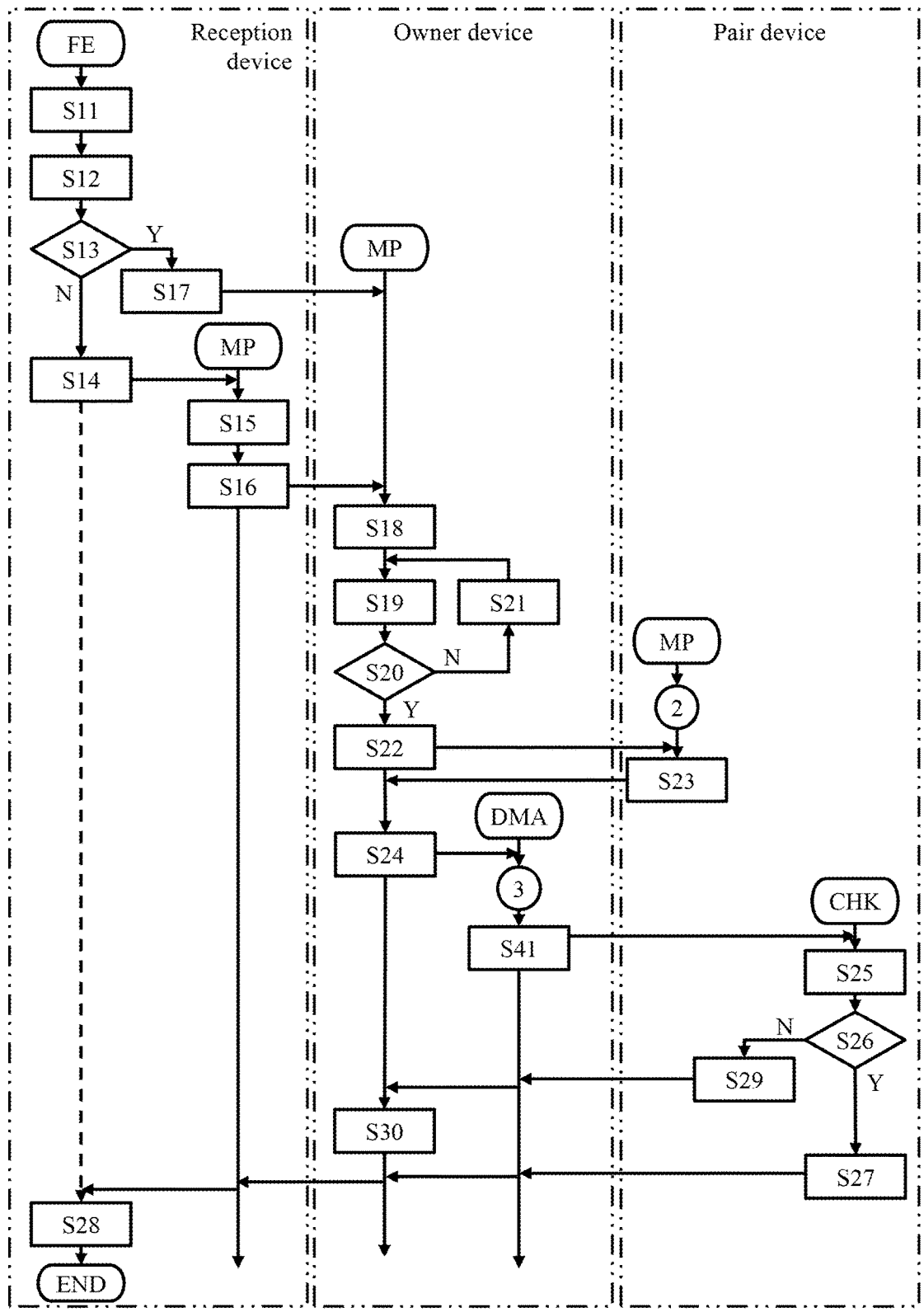
FIG. 11 is a flowchart obtained by dividing the entire processing illustrated FIG. 6 into processing at devices.

Although not illustrated in FIG. 7, the multi-stage DMA forwarding by the DMA 1051 of the owner device is completed (S41) as illustrated in FIG. 11, the pair device examines whether the write data received from the owner device is normal data based on the guarantee code (S25). This data check may be performed by the check unit 1012 included in the front end interface 101 of the pair device or may be performed by the check program P10 of the pair device. In the following, the data check is described to be performed by the pair device to clearly indicate that the data check may be performed by any of a hardware circuit and software.

Having determined that the write data received from the owner device through the DMA forwarding is normal (YES at S26), the pair device notifies the MP 1021 in the owner device of normal completion of the data doubling (S27).

Having received the notification of the normal completion, the MP 1021 in the owner device notifies the MP 1021 in the reception device of completion of the write command processing. The MP 1021 in the reception device notifies the host 40 as the command issuing source of normal completion of the write command processing through the front end interface 101 of the reception device (S28).

When it is determined that the received write data is not normal as a result of the data check by the pair device (NO at S26), the MP 1021 in the pair device notifies the MP 1021 in the owner device of the anomaly of the received write data (S29).

Having received the anomaly notification from the pair device, the MP 1021 in the owner device executes doubling data anomaly processing (S30). The doubling data anomaly processing will be described in detail with reference to FIG. 9.

Figure 8:
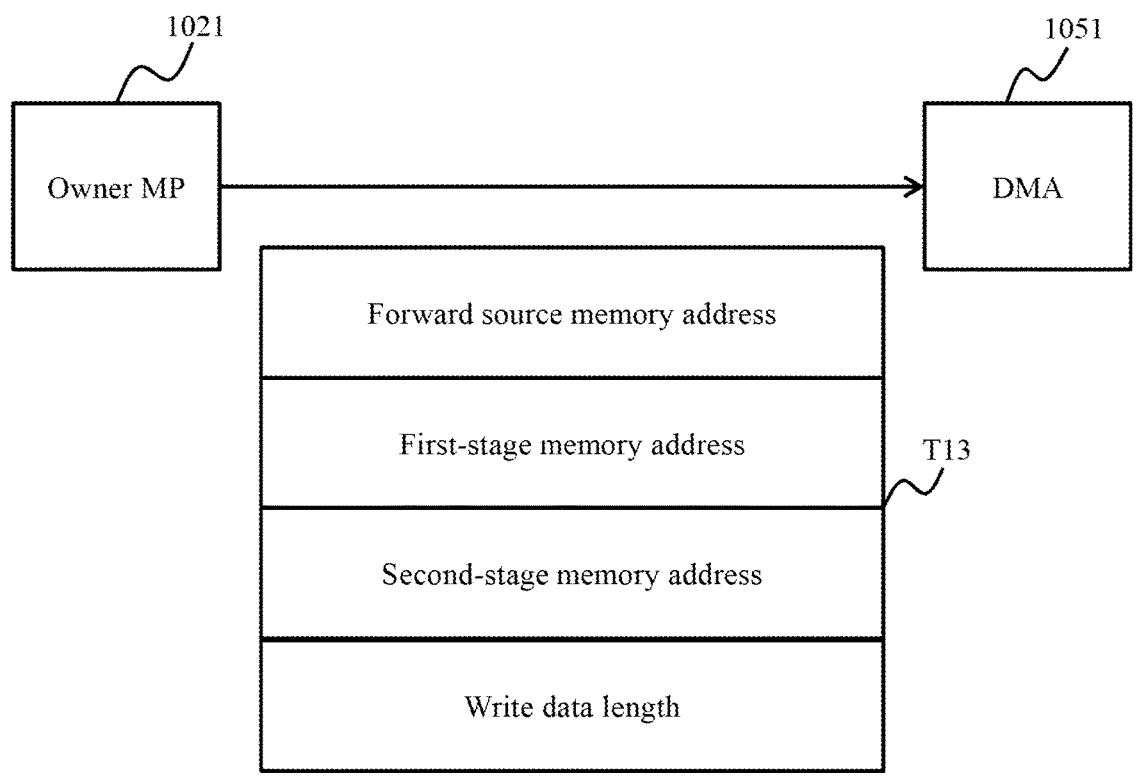
FIG. 8 is an explanatory diagram illustrating the content of a forward instruction transferred from the micro processor of the owner device to a data forwarding unit.

FIG. 8 illustrates the content of a forward instruction T13 provided from the MP 1021 in the owner device to the DMA 1051.

The forward instruction T13 provided from the MP 1021 in the owner device to the DMA 1051 includes, for example, a forward source memory address, a first-stage memory address, a second-stage memory address, and a write data length.

The forward source memory address is the leading address of write data stored in the memory 103 of the reception device. The first-stage memory address is the forward destination address of write data read from the memory 103 of the reception device. The write data read from the memory 103 of the reception device is forwarded to the memory 103 of the pair device through the memory 103 of the owner device by DMA forwarding. The first-stage memory address is used to transfer the write data from the memory 103 of the reception device to the memory 103 of the owner device.

The second-stage memory address is the forward destination address of write data stored in the memory 103 of the owner device. When data forwarding from the memory 103 of the reception device to the memory 103 of the owner device is referred to as first-stage forwarding (initial forwarding), data forwarding from the memory 103 of the owner device to the memory 103 of the pair device is referred to as second-stage forwarding (final forwarding).

Figure 9:
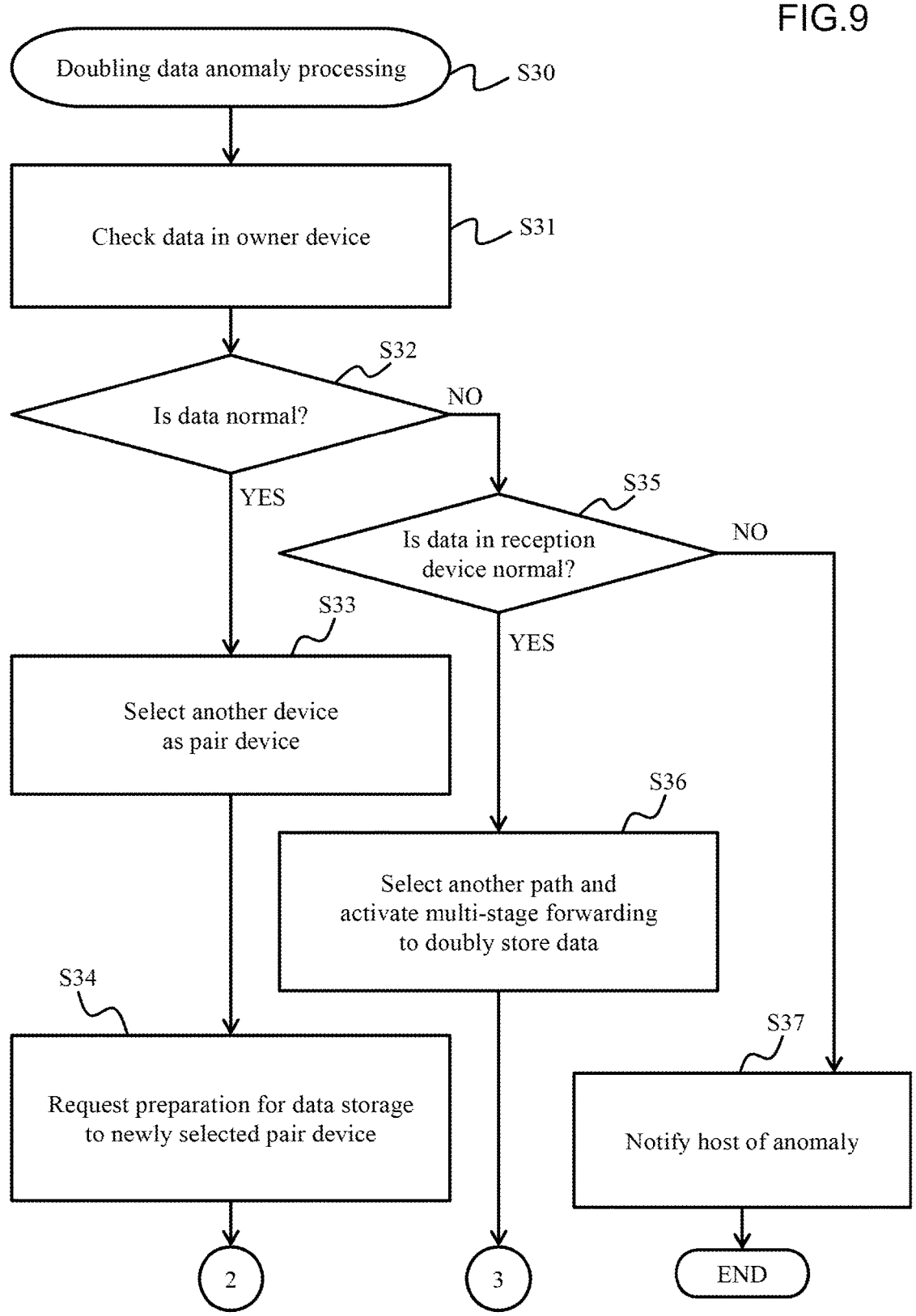
FIG. 9 is a flowchart following FIG. 7.

A flowchart illustrated in FIG. 9 illustrates the doubling data anomaly processing described at step S30 in FIG. 7 in detail.

The MP 1021 in the owner device checks the write data left in the memory 103 of the owner device based on the guarantee code (S31). The MP 1021 in the owner device determines whether the write data held by the owner device is normal (S32). When having determined that the write data in the owner device is normal (YES at S32), the MP 1021 in the owner device newly selects another storage device 10 as the pair device and updates the owner-pair correspondence table T12 (S33). Then, the MP 1021 in the owner device requests storage preparation for the write data to the newly selected pair device (S34), and returns to step S23 in FIG. 7.

When having determined that the write data left in the memory 103 of the owner device is not normal (NO at S32), the MP 1021 in the owner device requests the MP 1021 in the reception device to check the write data stored in the memory 103 of the reception device.

Figure 12:
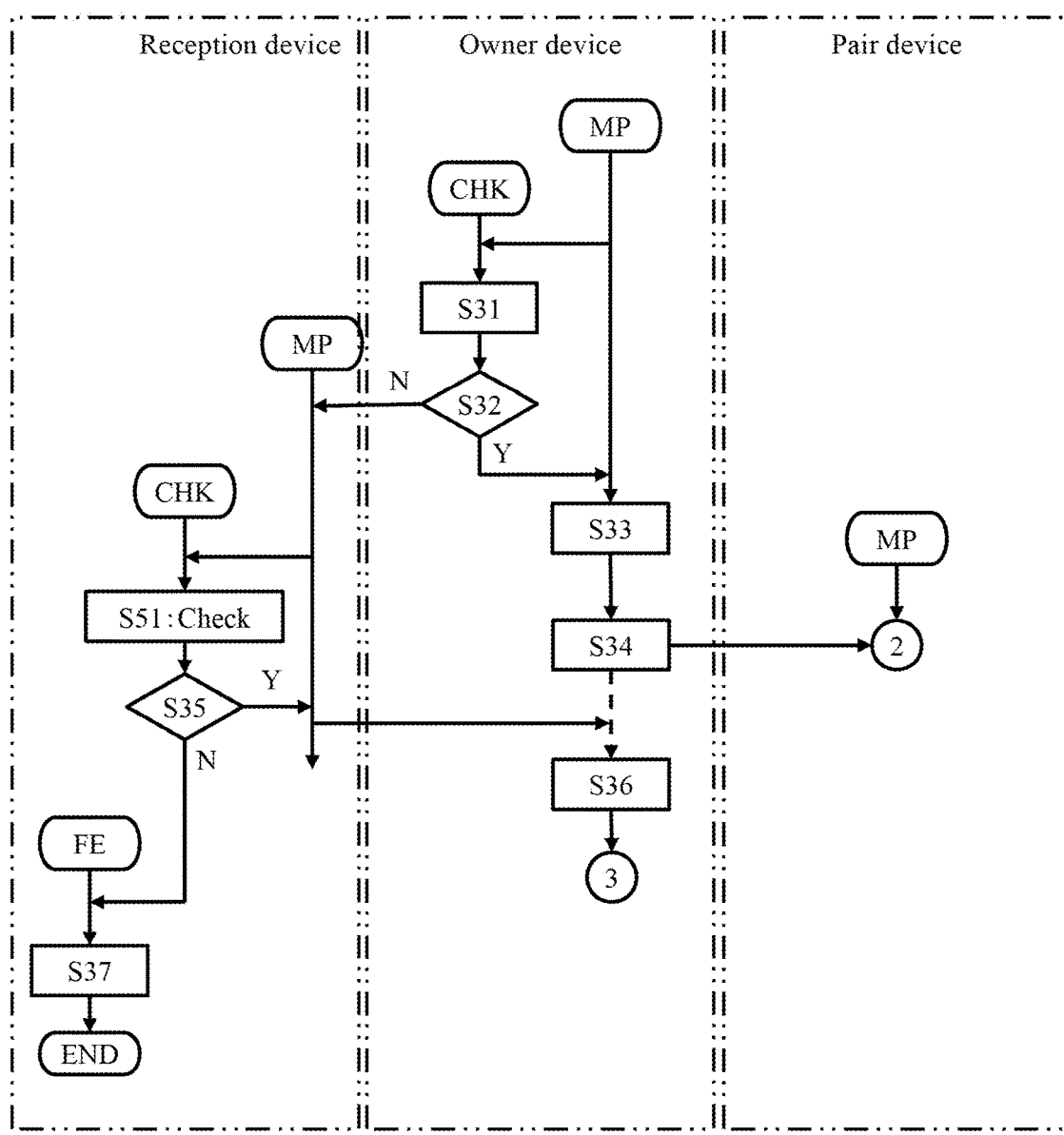
FIG. 12 is a flowchart obtained by dividing the processing illustrated in FIG. 9 into processing at devices.

Although not illustrated in FIG. 9, the reception device checks the write data stored in the memory 103 based on the guarantee code as described at step S51 in FIG. 12. The MP 1021 in the reception device determines whether the write data stored in the memory 103 of the reception device is normal data (S35).

When the write data in the reception device is normal (YES at S35), the MP 1021 in the reception device notifies the MP 1021 in the owner device. Having received the notification, the MP 1021 in the owner device switches a path used in DMA forwarding between the reception device and the owner device to another path, and provides the forward instruction to the DMA 1051 of the owner device (S36). Then, the process returns to step S25 in FIG. 7.

When having determined that the write data stored in the memory 103 of the reception device is not normal (NO at S35), the MP 1021 in the reception device notifies the host 40 of anomalous end of the write command processing through the front end interface 101 (S37).

Figure 10:
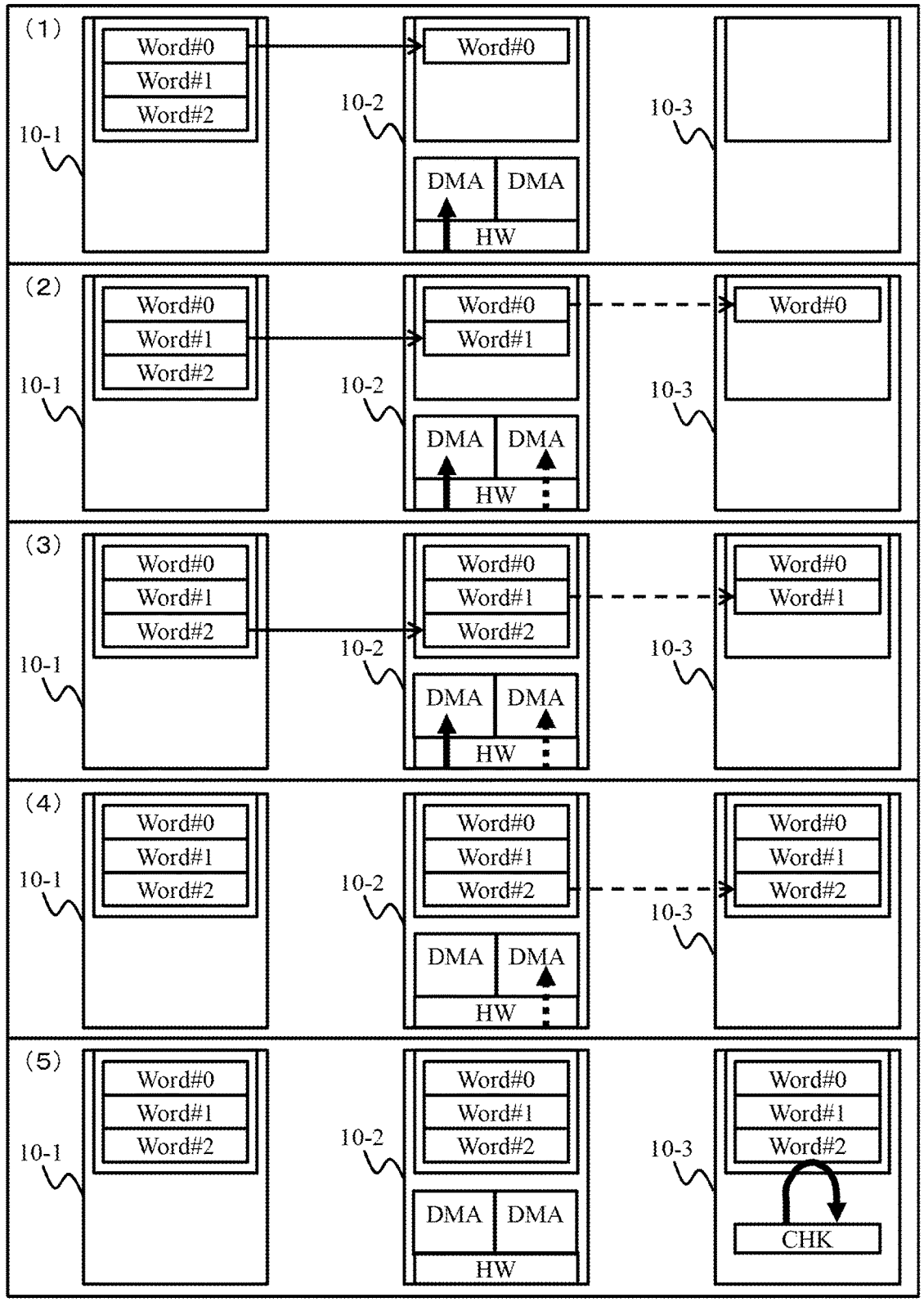
FIG. 10 is an explanatory diagram illustrating a data forwarding situation.

FIG. 10 is an explanatory diagram illustrating exemplary multi-stage DMA forwarding. FIG. 10 illustrates a case in which write data is forwarded in three pieces. As illustrated with a solid line arrow in FIG. 10(1), when activated upon the forward instruction from the MP 1021, the DMA 1051 forwards first data (Word #0) from the memory 103 of the reception device 10-1 to the memory 103 of the owner device 10-2 through the switch 20.

As illustrated with a dotted line arrow in FIG. 10(2), the DMA 1051 forwards the first data from the memory 103 of the owner device 10-2 to the memory 103 of the pair device 10-3. Simultaneously with the forwarding of the first data to the pair device 10-3, the DMA 1051 forwards second data (Word #1) from the memory 103 of the reception device 10-1 to the memory 103 of the owner device 10-2 as illustrated with a solid line arrow.

Similarly, as illustrated with a dotted line arrow in FIG. 10(3), the DMA 1051 forwards the second data from the memory 103 of the owner device 10-2 to the memory 103 of the pair device 10-3. Simultaneously with the forwarding of the second data to the pair device 10-3, the DMA 1051 forwards third data (Word #2) from the memory 103 of the reception device 10-1 to the memory 103 of the owner device 10-2 as illustrated with a solid line arrow.

Then, as illustrated with a dotted line arrow in FIG. 10(4), the DMA 1051 forwards the third data (Word #2) from the memory 103 of the reception device 10-1 to the memory 103 of the owner device 10-2.

As illustrated in FIG. 10(5), the pair device 10-3 checks the write data (Word #0, #1, #2) received from the reception device 10-1 through the owner device 10-2 based on the guarantee codes added to the write data. When it is checked that the write data is normally forwarded to the pair device 10-3 as a result of the check, doubling (redundant storage) of the write data is completed and the write command processing is ended. When the write command processing is normally ended, the write data stored in the memory 103 of the reception device 10-1 is unnecessary.

Figure 6:
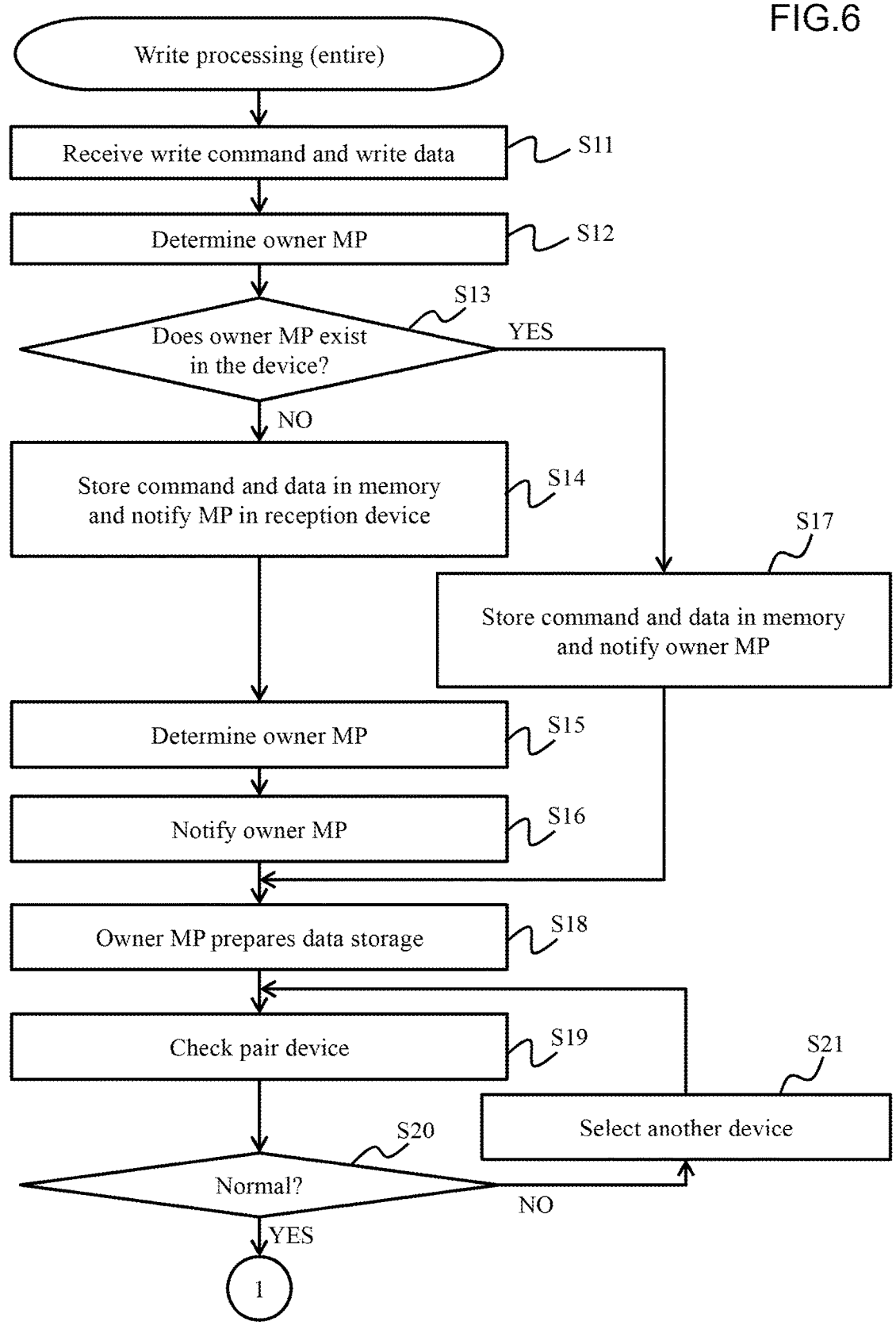
FIG. 6 is a flowchart of the entire write processing.

FIG. 11 is a flowchart obtained by dividing the processing described with reference to FIGS. 6 and 7 into execution agents of the steps. Similarly, FIG. 12 is a flowchart obtained by dividing the processing described with reference to FIG. 9 into execution agents of the steps. The processing contents in FIGS. 11 and 12 are already described with reference to FIGS. 6, 7, and 9, and thus any duplicate description will be omitted.

According to the present embodiment thus configured, write data is examined only once, which leads to improvement of response performance when the host 40 writes the write data. In the present embodiment, write data is examined only at the pair device as a final forward destination source, which leads to reduction of a time taken for the examination. Since the memory 103 of the owner device is merely a relay place used to forward write data to the memory 103 of the pair device, the write data left in the memory 103 of the owner device can be regarded to be normal when the write data is determined to be normal by the pair device.

According to the present embodiment, the owner device can perform DMA forwarding of write data received by the reception device to the pair device through the owner device by providing a forward instruction to the DMA 1051 once. In the present embodiment, activation of DMA forwarding only needs to be instructed once, which leads to, together with the above-described reduction of the number of times that write data is checked, further improvement of the response performance at write processing.

[Embodiment 2]

The following describes a second embodiment with reference to FIGS. 13 to 16. Each embodiment below including the present embodiment corresponds to a modification of the first embodiment, and thus the description will be focused on any difference thereof from the first embodiment. In the present embodiment, DMA forwarding is executed at two stages.

Figure 13:
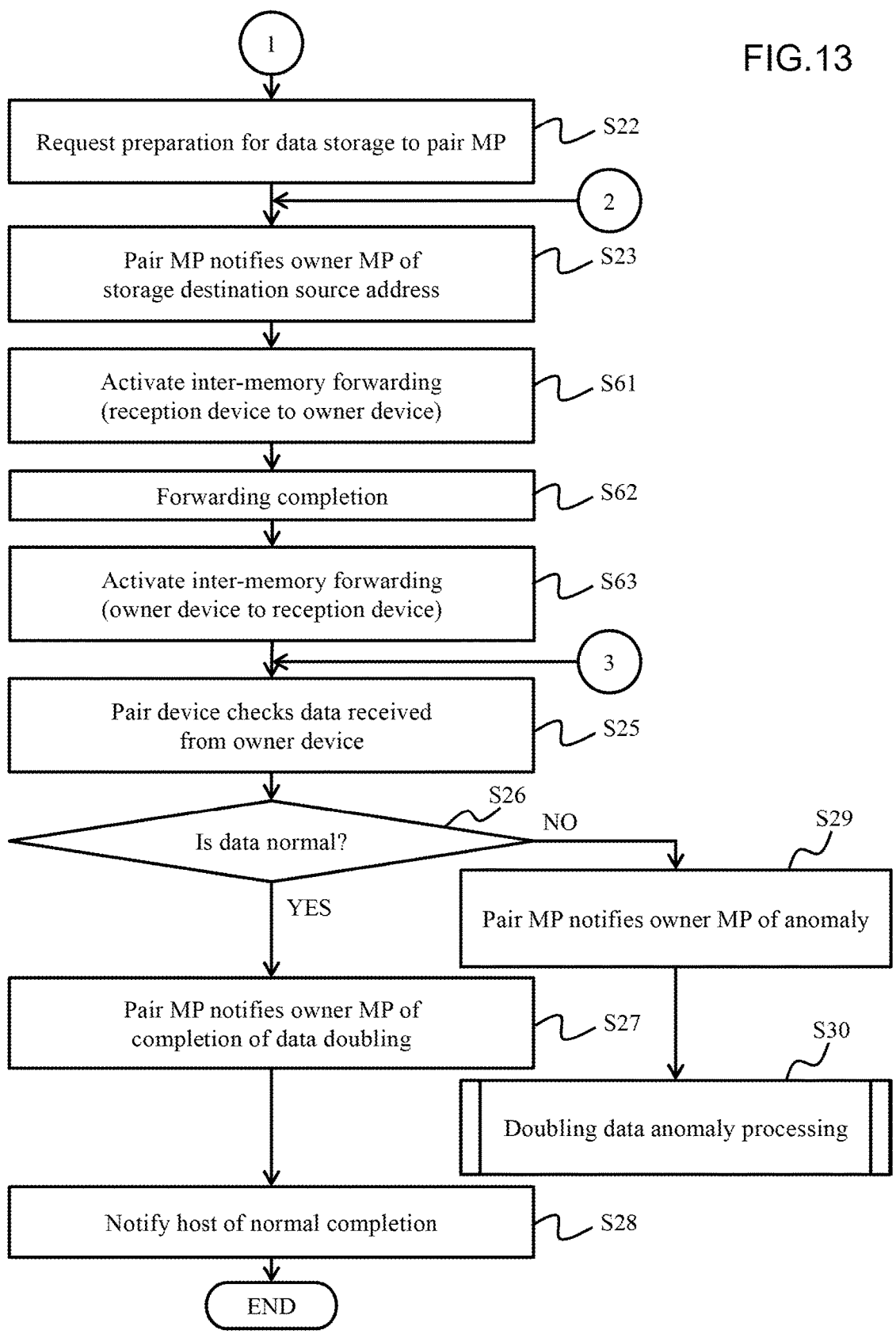
FIG. 13 is a flowchart of part of write processing according to a second embodiment.

FIG. 13 illustrates part of write command processing according to the present embodiment. The present processing corresponds to the processing illustrated in FIG. 7. Unlike the flowchart illustrated in FIG. 7, a flowchart illustrated in FIG. 13 includes steps S22, S23, and S25 to S30 and also includes steps S61, S62, and S63 in place of step S25. The following describes new steps S61 to S63 in the present embodiment.

In the present embodiment, when write data is forwarded from the reception device to the pair device through the owner device, the MP 1021 in the owner device first provides a first forward instruction to activate the DMA 1051 of the owner device (S61). Accordingly, the DMA 1051 of the owner device performs DMA forwarding of write data from the memory 103 of the reception device to the memory 103 of the owner device.

When this first DMA forwarding is completed (S62), the MP 1021 in the owner device provides a second forward instruction to activate the DMA 1051 of the owner device (S63). Accordingly, the DMA 1051 of the owner device performs DMA forwarding of write data from the memory 103 of from the owner device to the memory 103 of the pair device.

Figure 14:
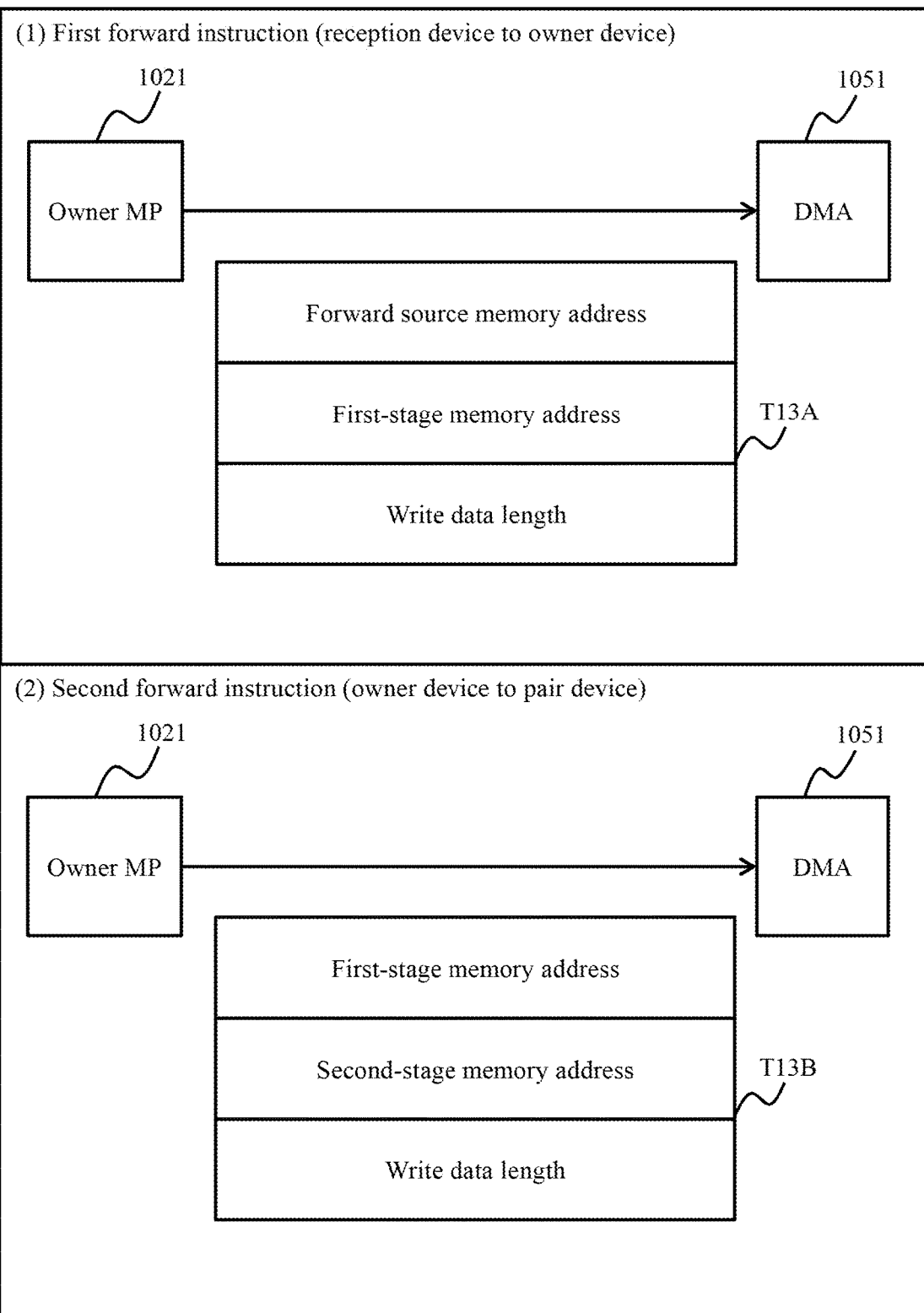
FIG. 14 is an explanatory diagram illustrating the content of a forward instruction transferred from the micro processor of the owner device to the data forwarding unit.

FIG. 14 illustrates the contents of the forward instructions provided from the MP 1021 in the owner device to the DMA 1051 of the owner device. As illustrated in FIG. 14(1), the first forward instruction includes the forward source memory address in the memory 103 of the reception device, the first-stage memory address in the memory 103 of the owner device, and the write data length. As illustrated in FIG. 14(2), the second forward instruction includes the first-stage memory address, the second-stage memory address in the memory 103 of the pair device, and the write data length.

Figure 15:
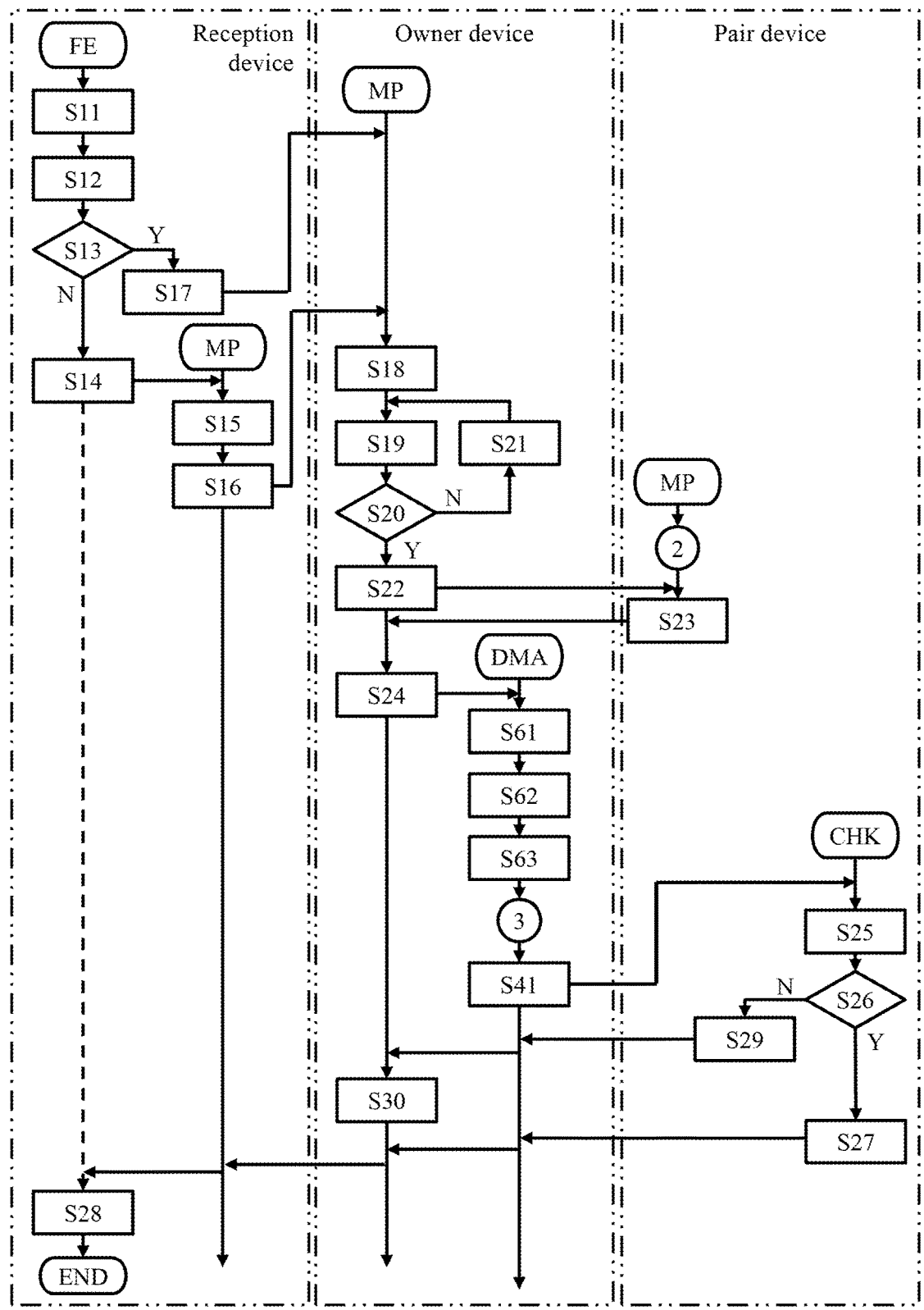
FIG. 15 is a flowchart obtained by dividing the processing illustrated in FIG. 13 into processing at devices.

FIG. 15 is a flowchart obtained by dividing the write processing according to the present embodiment into execution agents of the steps. The processing contents are already described with reference to FIG. 13, and thus any duplicate description will be omitted.

Figure 16:
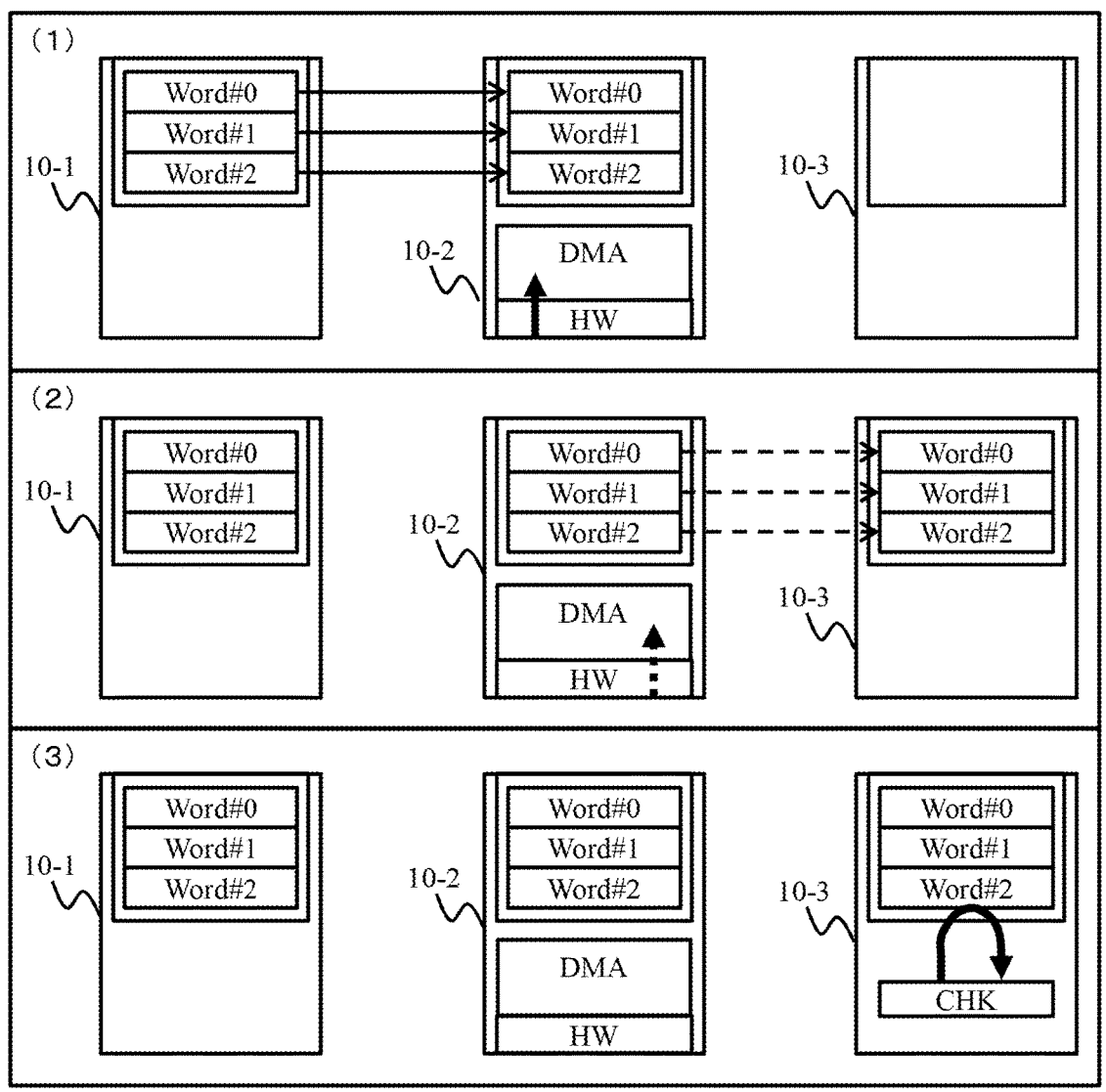
FIG. 16 is an explanatory diagram illustrating a data forwarding situation.

FIG. 16 is an explanatory diagram illustrating exemplary forward instructions provided from the owner device to the DMA 1051 at two steps. As illustrated with a solid line arrow FIG. 16(1), when activated in response to the first forward instruction from the MP 1021, the DMA 1051 performs DMA forwarding of all illustrated write data (Word #0, Word #1, and Word #2) from the memory 103 of the reception device 10-1 to the memory 103 of the owner device 10-2 through the switch 20.

As illustrated with a dotted line arrow in FIG. 16(2), the DMA 1051 forwards all write data from the memory 103 of the owner device 10-2 to the memory 103 of the pair device 10-3.

As illustrated in FIG. 16(3), the pair device 10-3 checks the write data received from the reception device 10-1 through the owner device 10-2. When it is checked that the write data is normally forwarded to the pair device 10-3 as a result of the check, doubling (redundant storage) of the write data is completed and the write command processing is ended.

In the present embodiment thus configured, too, whether the forwarding is normally ended is examined only at the pair device as a final forward destination source, which leads to reduction of a time taken for the examination and thus improvement of the response performance of the write processing.

The present invention is not limited to the above-described embodiments. The skilled person in the art could perform, for example, various kinds of additions and changes without departing from the scope of the present invention.

REFERENCE SIGNS LIST

1: storage system, 10: storage device, 20: switch, 30: storage unit, 31: storage, 32: logical volume, 40: host computer, 50: communication network, 102: CPU, 103: memory, 105: switch interface, 1051: DMA forwarding unit

The invention claimed is:

1. A storage system configured to process a command from a command issuing apparatus, the storage system comprising:
  a plurality of storage devices coupled to the command issuing apparatus, the plurality of storage devices each including a memory configured to store target data, a data forwarding unit configured to forward data from the memory of the storage device to a memory of another storage device, and a control unit configured to operate the data forwarding unit by providing a forward instruction to the data forwarding unit;
  a first storage device configured to receive a command from the command issuing apparatus and included in the plurality of storage devices;
  a second storage device configured to manage target data of the command and included in the plurality of storage devices; and
  a third storage device configured to form a copy pair with the second storage device for the target data and store the target data and included in the plurality of storage devices,
  wherein, when the target data is forwarded from the first storage device to the third storage device through the second storage device and stored in the third storage device, the first storage notifies the second storage device of a reception of the command,
  the second storage device forwards the target data from the memory of the first storage device to the memory of the third storage device through the memory of the second storage device by providing a once forward instruction from the control unit of the second storage device to the data forwarding unit of the second storage device,
  the second storage device redundantly stores the target data by forming a pair of the target data stored in the memory of the second storage device and the target data stored in the memory of the third storage device, and
  the forward instruction includes a forward source memory address that is the leading address of the target data stored in the memory of the first storage device, a first-stage memory address that is the forward destination address of the target data to the memory of the second device, and a second-stage memory address that is the forward destination address of the target data to the memory of the third storage device.

2. The storage system according to claim 1, wherein
  the third storage device examines the target data received from the second storage device, and
  when the third storage device determines that the target data is correct data, the target data stored in the second storage device is handled as correct data.

3. The storage system according to claim 1, wherein
  the plurality of storage devices are coupled to a plurality of common storages,
  the first storage device is a storage device having received a command from the command issuing apparatus among the plurality of storage devices,
  the second storage device is a storage device configured to manage a storage storing the target data among the plurality of storage devices, and
  the third storage device is a storage device determined in advance to form a copy pair with the second storage device among the plurality of storage devices.

4. The storage system according to claim 3, wherein
  the plurality of storage devices are mutually coupled to form a cluster through a common connection apparatus configured to allow data forwarding between the memories.

5. The storage system according to claim 4, wherein
  the plurality of storage devices each further include a switch interface unit for bidirectional communication through the common connection apparatus, and
  the switch interface unit is provided with the data forwarding unit.

6. A storage system configured to process a command from a command issuing apparatus, the storage system comprising:
  a plurality of storage devices coupled to the command issuing apparatus, the plurality of storage devices each including a memory configured to store target data, a data forwarding unit configured to forward data from the memory of the storage device to a memory of another storage device, and a control unit configured to operate the data forwarding unit by providing a forward instruction to the data forwarding unit;
  a first storage device configured to receive a command from the command issuing apparatus and included in the plurality of storage devices;

a second storage device configured to manage target data of the command and included in the plurality of storage devices; and
a third storage device configured to form a copy pair with the second storage device for the target data and store the target data, the third storage device being included in the plurality of storage devices,
wherein, when the target data is forwarded from the first storage device to the third storage device through the second storage device and stored in the third storage device, the first storage notifies the second storage device of a reception of the command,
the second storage device:
forwards the target data from the memory of the first storage device to the memory of the second storage device and stores the target data in the memory of the second storage device by providing a first forward instruction from the control unit of the second storage device to the data forwarding unit of the second storage device;
forwards the target data from the memory of the second storage device to the memory of the third storage device and stores the target data in the memory of the third storage device by providing a second forward instruction from the control unit of the second storage device to the data forwarding unit of the second storage device; and
the first forward instruction includes a forward source memory address that is the leading address of the target data stored in the memory of the first storage device and a first-stage memory address that is the forward destination address of the target data to the memory of the second device, and
the second forward instruction includes the first-stage memory address and a second-stage memory address that is the forward destination address of the target data to the memory of the third storage device.

7. The storage system according to claim 6, wherein
the third storage device examines the target data received from the second storage device, and
when the third storage device determines that the target data is correct data, the target data stored in the second storage device is handled as correct data.

8. The storage system according to claim 6, wherein
the plurality of storage devices are coupled to a plurality of common storages,
the first storage device is a storage device having received a command from the command issuing apparatus among the plurality of storage devices,
the second storage device is a storage device configured to manage a storage storing the target data among the plurality of storage devices, and
the third storage device is a storage device determined in advance to form a copy pair with the second storage device among the plurality of storage devices.

9. The storage system according to claim 8, wherein
the plurality of storage devices are mutually coupled to form a cluster through a common connection apparatus configured to allow data forwarding between the memories, and
the plurality of storage devices each include the memory.

10. The storage system according to claim 9, wherein
the plurality of storage devices each further include a switch interface unit for bidirectional communication through the common connection apparatus, and
the switch interface unit is provided with the data forwarding unit.

11. A storage device used in a storage system, the storage device comprising:
an inter-device communication unit coupled to each of a command receiving side storage device configured to receive a command from a command issuing apparatus and a copy pair side storage device configured to store a copy of target data of the command to perform bidirectional communication therebetween;
a memory configured to store data;
a data forwarding unit configured to forward data between the memory and each of a memory of the command receiving side storage device and a memory of the copy pair side storage device; and
a control unit configured to operate the data forwarding unit by providing a forward instruction to the data forwarding unit,
wherein, when the target data is forwarded from the memory of the command receiving side storage device to the memory of the copy pair side storage device through the memory of the storage device by the data forwarding unit and stored in the memory of the copy pair side storage device, the control unit stores the target data in the memory of the storage device so that the target data is redundantly stored in the memory of the storage device and the copy pair side storage device,
the command receiving side storage device notifies the second storage device of a reception of the command,
the control unit forwards the target data from the memory of the command receiving side storage device to the memory of the copy pair side storage device through the memory of the storage device by providing once a forward instruction to the data forwarding unit,
the control unit redundantly stores the target data by forming a pair of the target data stored in the memory of the storage device and the target data stored in the memory of the copy pair side storage device, and
the forward instruction includes a forward source memory address that is the leading address of the target data stored in the memory of a first storage device, a first-stage memory address that is the forward destination address of the target data to the memory of the second storage device, and a second-stage memory address that is the forward destination address of the target data to the memory of a third storage device.

12. The storage device according to claim 11, wherein the control unit receives a result of examination of the target data stored in the memory of the copy pair side storage device, and handles the target data stored in the memory of the storage device as correct data when the examination result indicates that the target data is correct data.

13. A storage device used in a storage system, the storage device comprising:
an inter-device communication unit coupled to each of a command receiving side storage device configured to receive a command from a command issuing apparatus and a copy pair side storage device configured to store a copy of target data of the command to perform bidirectional communication therebetween;
a memory configured to store data;
a data forwarding unit configured to forward data between the memory and each of a memory of the command receiving side storage device and a memory of the copy pair side storage device; and
a control unit configured to operate the data forwarding unit by providing a forward instruction to the data forwarding unit, wherein, when the target data is forwarded from the memory of the command receiving side storage device to the memory of the copy pair side storage device through the memory of the storage device by the data forwarding unit and stored in the memory of the copy pair side storage device, the control unit stores the target data in the memory of the storage device so that the target data is redundantly stored in the memory of the storage device and the copy pair side storage device, forwards the target data from the memory of the command receiving side storage device to the memory of the storage device and stores the target data in the memory of the storage device by providing a first forward instruction to the data forwarding unit, forwards the target data from the memory of the storage device to the memory of the copy pair side storage device by providing a second forward instruction to the data forwarding unit and stores the target data in the memory of the copy pair side storage device, and redundantly stores the target data by forming a pair of the target data stored in the memory of the storage device and the target data stored in the memory of the copy pair side storage device, and wherein the first forward instruction includes a forward source memory address that is the leading address of the target data stored in the memory of the first storage device and a first-stage memory address that is the forward destination address of the target data to the memory of the second device, and the second forward instruction includes the first-stage memory address and a second-stage memory address that is the forward destination address of the target data to the memory of the third storage device.

14. A method of controlling a storage system, the storage system including:

a plurality of storage devices coupled to a command issuing apparatus configured to issue a command, the plurality of storage devices each including a memory configured to store target data, a data forwarding unit configured to forward data from the memory of the storage device to a memory of another storage device, and a control unit configured to operate the data forwarding unit by providing a forward instruction to the data forwarding unit;

a first storage device configured to receive a command from the command issuing apparatus and included in the plurality of storage devices;

a second storage device configured to manage target data of the command and included in the plurality of storage devices; and a third storage device configured to form a copy pair with the second storage device for the target data and store the target data and included in the plurality of storage devices, the method comprising:

notifying the second storage device of reception of a command from the command issuing apparatus;

forwarding target data from the memory of the first storage device to the memory of the third storage device through the memory of the second storage device by providing a once forward instruction from the control unit of the second storage device to the data forwarding unit of the second storage device; and storing the target data in the second storage device and the third storage device such that the target data is redundantly stored in the second storage device and the third storage device, wherein the forward instruction includes a forward source memory address that is the leading address of the target data stored in the memory of the first storage device, a first-stage memory address that is the forward destination address of the target data to the memory of the second device, and a second-stage memory address that is the forward destination address of the target data to the memory of the third storage device.

15. The method of controlling a storage system according to claim 14, further comprising:

examining, via the third storage device, the target data received form the second storage device; and determining, via the third storage device, whether the target data is correct data, wherein, when the third storage device determines that the target data is correct data, the target data stored in the second storage device is handled as correct data.

16. The method of controlling a storage system according to claim 13, wherein the method further comprises: redundantly storing the target data by forming a pair of the target data stored in the memory of the second storage device and the target data stored in the memory of the third storage device.

17. A method of controlling a storage system, the storage system including:

a plurality of storage devices coupled to a command issuing apparatus configured to issue a command, the plurality of storage devices each including a memory configured to store target data, a data forwarding unit configured to forward data from the memory of the storage device to a memory of another storage device, and a control unit configured to operate the data forwarding unit by providing a forward instruction to the data forwarding unit;

a first storage device configured to receive a command from the command issuing apparatus and included in the plurality of storage devices;

a second storage device configured to manage target data of the command and included in the plurality of storage devices; and a third storage device configured to form a copy pair with the second storage device for the target data and store the target data and included in the plurality of storage devices, the method comprising:

forwarding the target data from the memory of the first storage device to the memory of the second storage device and storing the target data in the memory of the second storage device by providing a first forward instruction from the control unit of the second storage device to the data forwarding unit of the second storage device; and forwarding the target data from the memory of the second storage device to the memory of the third storage device and storing the target data in the memory of the third storage device by providing a second forward instruction from the control unit of the second storage device to the data forwarding unit of the second storage device; and storing the target data by forming a pair of the target data stored in the memory of the second storage device and the target data stored in the memory of the third storage device, wherein the first forward instruction includes a forward source memory address that is the leading address of the target data stored in the memory of the first storage device, a first-stage memory address that is the forward destination address of the target data to the memory of the second device, and the second forward instruction includes the first-stage memory address and a second-stage memory address that is the forward destination address of the target data to the memory of the third storage device.

\* \* \* \* \*